US011200413B2

(12) United States Patent
Burdick et al.

(10) Patent No.: US 11,200,413 B2
(45) Date of Patent: Dec. 14, 2021

(54) TABLE RECOGNITION IN PORTABLE DOCUMENT FORMAT DOCUMENTS

(71) Applicant: International Business Machines Corporation, Armonk, NY (US)

(72) Inventors: Douglas Ronald Burdick, San Jose, CA (US); Wei Cheng, Marina Del Rey, CA (US); Alexandre Evfimievski, San Jose, CA (US); Marina Danilevsky Hailpern, San Jose, CA (US); Rajasekar Krishnamurthy, San Jose, CA (US); Shajith Ikbal Mohamed, Chennai (IN); Prithviraj Sen, San Jose, CA (US); Shivakumar Vaithyanathan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 16/050,803

(22) Filed: Jul. 31, 2018

(65) Prior Publication Data
US 2020/0042785 A1 Feb. 6, 2020

(51) Int. Cl.
*G06K 9/00* (2006.01)
*G06F 40/177* (2020.01)
*G06F 40/284* (2020.01)

(52) U.S. Cl.
CPC ....... *G06K 9/00449* (2013.01); *G06F 40/177* (2020.01); *G06F 40/284* (2020.01); *G06K 9/00463* (2013.01)

(58) Field of Classification Search
CPC .......... G06K 9/00449; G06K 9/00463; G06K 9/00442; G06K 9/00469
See application file for complete search history.

(56) References Cited

U.S. PATENT DOCUMENTS

| 4,504,969 A | * | 3/1985 | Suzuki | ...... G06K 9/00 382/175 |
| 5,420,695 A | | 5/1995 | Ohta | |

(Continued)

OTHER PUBLICATIONS

He, Dafang et al. "Multi-scale Multi-task FCN for Semantic Page Segmentation and Table Detection", 2017 IEEE. <https://doi.org/10.1109/ICDAR.2017.50> (Year: 2017).*

(Continued)

*Primary Examiner* — Kavita Stanley
*Assistant Examiner* — Tyler Schallhorn
(74) *Attorney, Agent, or Firm* — Ryan, Mason & Lewis, LLP

(57) ABSTRACT

Methods, systems, and computer program products for table recognition in PDF documents are provided herein. A computer-implemented method includes discretizing one or more contiguous areas of a PDF document; identifying one or more white-space separator lines within the one or more discretized contiguous areas of the PDF document; detecting one or more candidate table regions within the one or more discretized contiguous areas of the PDF document by clustering the one or more white-space separator lines into one or more grids; and outputting at least one of the candidate table regions as a finalized table in accordance with scores assigned to each of the one or more candidate table regions based on (i) border information and (ii) cell structure information.

20 Claims, 6 Drawing Sheets

(56) References Cited

U.S. PATENT DOCUMENTS

| | | | | |
|---|---|---|---|---|
| 5,485,566 | A * | 1/1996 | Rahgozar | G06K 9/00463 |
| | | | | 382/175 |
| 5,668,892 | A * | 9/1997 | Itonori | G06K 9/00449 |
| | | | | 382/177 |
| 5,708,730 | A * | 1/1998 | Itonori | G06K 9/00449 |
| | | | | 358/462 |
| 5,737,442 | A * | 4/1998 | Alam | G06K 9/00449 |
| | | | | 382/175 |
| 6,006,240 | A | 12/1999 | Handley | |
| 6,173,073 | B1 | 1/2001 | Wang | |
| 6,711,292 | B2 * | 3/2004 | Wang | G06K 9/00449 |
| | | | | 382/176 |
| 6,757,870 | B1 * | 6/2004 | Stinger | G06F 17/2247 |
| | | | | 715/234 |
| 7,602,972 | B1 * | 10/2009 | Wei | G06F 17/245 |
| | | | | 358/453 |
| 7,707,488 | B2 | 4/2010 | Gurcan et al. | |
| 7,953,682 | B2 * | 5/2011 | Smith | G09G 3/3216 |
| | | | | 706/25 |
| 8,121,412 | B2 * | 2/2012 | Predovic | G06K 9/00463 |
| | | | | 382/187 |
| 8,176,414 | B1 * | 5/2012 | Baluja | G06F 17/212 |
| | | | | 715/238 |
| 8,412,757 | B2 * | 4/2013 | Das Gupta | G06F 17/16 |
| | | | | 708/207 |
| 8,443,278 | B2 | 5/2013 | Mansfield et al. | |
| 8,718,364 | B2 * | 5/2014 | Enomoto | G06K 9/00449 |
| | | | | 382/173 |
| 8,818,100 | B2 * | 8/2014 | Bastos dos Santos | |
| | | | | G06F 17/243 |
| | | | | 382/173 |
| 8,914,419 | B2 | 12/2014 | Gerard et al. | |
| 9,235,756 | B2 | 1/2016 | Ma | |
| 9,268,999 | B2 * | 2/2016 | Xu | G06K 9/00463 |
| 9,348,848 | B2 * | 5/2016 | Dong | G06F 17/245 |
| 9,367,766 | B2 * | 6/2016 | Wang | G06K 9/00463 |
| 9,569,417 | B2 | 2/2017 | Byron et al. | |
| 9,697,423 | B1 * | 7/2017 | Bellert | G06K 5/04 |
| 9,727,532 | B2 * | 8/2017 | Perronnin | G06F 17/16 |
| 9,898,523 | B2 * | 2/2018 | Cox | G06F 17/246 |
| 9,990,347 | B2 | 6/2018 | Raskovic et al. | |
| 10,242,257 | B2 * | 3/2019 | Hosabettu | G06K 9/00449 |
| 10,339,212 | B2 * | 7/2019 | Agrawal | G06N 7/005 |
| 10,599,924 | B2 * | 3/2020 | Yang | G06K 9/34 |
| 2003/0097384 | A1 * | 5/2003 | Hu | G06F 17/245 |
| | | | | 715/234 |
| 2004/0093355 | A1 | 5/2004 | Stinger | |
| 2005/0210371 | A1 * | 9/2005 | Pollock | G06F 17/212 |
| | | | | 715/212 |
| 2007/0092140 | A1 * | 4/2007 | Handley | G06K 9/00456 |
| | | | | 382/176 |
| 2007/0186152 | A1 * | 8/2007 | Gurcan | G06F 17/211 |
| | | | | 715/209 |
| 2008/0040655 | A1 * | 2/2008 | Tanaka | G06K 9/00449 |
| | | | | 715/228 |
| 2008/0291122 | A1 * | 11/2008 | Smith | G09G 3/3216 |
| | | | | 345/55 |
| 2009/0271433 | A1 * | 10/2009 | Perronnin | G06F 17/16 |
| 2009/0304282 | A1 * | 12/2009 | Predovic | G06K 9/00422 |
| | | | | 382/187 |
| 2010/0299379 | A1 * | 11/2010 | Das Gupta | G06F 17/16 |
| | | | | 708/207 |
| 2011/0164813 | A1 * | 7/2011 | Enomoto | G06K 9/00449 |
| | | | | 382/164 |
| 2012/0121182 | A1 * | 5/2012 | Predovic | G06K 9/00422 |
| | | | | 382/189 |
| 2013/0191715 | A1 * | 7/2013 | Raskovic | G06F 17/245 |
| | | | | 715/227 |
| 2013/0290376 | A1 | 10/2013 | Dong et al. | |
| 2015/0026178 | A1 | 1/2015 | Byron et al. | |
| 2016/0026899 | A1 * | 1/2016 | Wang | G06K 9/72 |
| | | | | 382/176 |
| 2016/0104077 | A1 * | 4/2016 | Jackson, Jr. | G06F 17/2294 |
| | | | | 706/12 |
| 2017/0193292 | A1 * | 7/2017 | Bellert | G06K 5/04 |
| 2019/0026550 | A1 * | 1/2019 | Yang | G06N 3/0454 |
| 2019/0050381 | A1 * | 2/2019 | Agrawal | G06F 17/245 |
| 2019/0266394 | A1 * | 8/2019 | Yu | G06K 9/00456 |
| 2019/0278837 | A1 * | 9/2019 | Agrawal | G06N 7/005 |
| 2019/0278853 | A1 * | 9/2019 | Chen | G06F 16/2282 |
| 2019/0340240 | A1 * | 11/2019 | Duta | G06F 16/3344 |
| 2020/0167558 | A1 * | 5/2020 | Yang | G06K 9/00456 |
| 2020/0175267 | A1 * | 6/2020 | Schafer | G06K 9/00463 |

OTHER PUBLICATIONS

Pasupat et al., "Compositional Semantic Parsing on Semi-Structured Tables," 2015. http://nlp.stanford.edu/software/sempre/wikitable/.

ip.com, IPCOM000245463D, Automatic Transformation of Unstructured and Semi-structured Document Tables to Structured Relational Database Format, Mar. 11, 2016.

Cruz et al., Semantic Extraction of Geographic Data from Web Tables for Big Data Integration, 2013.

Chen et al., "Automatic web spreadsheet data extraction," in Proceedings of the 3rd International Workshop on Semantic Search over the Web, 2013.

Barowy et al., "Flashrelate: extracting relational data from semi-structured spreadsheets using examples," in ACM SIGPLAN Notices, 2015.

Chen et al., "Integrating spreadsheet data via accurate and low-effort extraction," in Proceedings of the 20th ACM SIGKDD international conference on Knowledge discovery and data mining, 2014.

Chiticariu et al., "Transparent machine learning for information extraction," in EMNLP (Tutorial), 2015.

Gobel et al., "A methodology for evaluating algorithms for table understanding in pdf documents," in Proceedings of the 2012 ACM symposium on Document engineering, 2012.

Yildiz et al., "pdf2table: A method to extract table information from PDF files," in Proceedings of the 2nd Indian International Conference on Artificial Intelligence, 2005.

Cohen, W., "Fast effective rule induction," in in Proceedings of the 12th International Conference on Machine Learning, 1995.

Rastan et al., "Texus: A task-based approach for table extraction and understanding," in Proceedings of the 2015 ACM Symposium on Document Engineering, 2015.

Chen et al., "Senbazuru: A prototype spreadsheet database management system," Proceedings of the VLDB Endowment, 2013.

Adelfio et al., "Schema extraction for tabular data on the web," Proc. VLDB Endow., 2013.

Jauhar et al., "Tables as semi-structured knowledge for question answering," in Proceedings of the 54th Annual Meeting of the Association for Computational Linguistics, 2016.

Pasupat et al., "Inferring logical forms from denotations," in Proceedings of the 54th Annual Meeting of the Association for Computational Linguistics, 2016, pp. 23-32.

Yin et al., "Neural enquirer: Learning to query tables with natural language," arXiv preprint arXiv:1512.00965, 2015.

Liu et al., "Identifying table boundaries in digital documents via sparse line detection," in Proceedings of the 17th ACM conference on Information and knowledge management, 2008.

Liu et al., "Improving the table boundary detection in pdfs by fixing the sequence error of the sparse lines," in 10th International Conference on Document Analysis and Recognition, 2009.

Seth et al., "Segmenting tables via indexing of value cells by table headers," in Proceedings of the 2013 12th International Conference on Document Analysis and Recognition, 2013.

Zanibbi et al., "A survey of table recognition: Models, observations, transformations, and inferences," International Journal of Document Analysis and Recognition (IJDAR), 2004.

Embley et al., "Table-processing paradigms: A research survey," International Journal of Document Analysis and Recognition (IJDAR), 2006.

Couasnon et al., "Recognition of tables and forms," in Handbook of Document Image Processing and Recognition, 2014.

(56) References Cited

OTHER PUBLICATIONS

Liu, Y., "Tableseer: automatic table extraction, search, and understanding," Ph.D. dissertation, The Pennsylvania State University, 2009.
Fang et al., "Table header detection and classification," in Proceedings of the 26th AAAI Conference on Artificial Intelligence, 2012.
Perez-Arriaga et al., TAO: System for Table Detection and Extraction from PDF Documents, Proceedings of the Twenty-Ninth International Florida Artificial Intelligence Research Society Conference, 2016.
Fang et al., A Table Detection Method for Multipage PDF Documents via Visual Seperators and Tabular Structures, 2011 International Conference on Document Analysis and Recognition.
Chandran et al., Structural Recognition of Tabulated Data. Proc. 2nd Intl. Conf. on Document Analysis and Recognition (ICDAR), Tsukuba, Japan, Oct. 20-22, 1993, pp. 516-519.
Itonori, K., Table Structure Recognition Based on Textblock Arrangement and Ruled Line Position. Proc. 2nd Intl. Conf. on Document Analysis and Recognition (ICDAR), Tsukuba, Japan, Oct. 20-22, 1993, pp. 765-768.
Kieninger, The T-Recs Table Recognition and Analysis System. Springer, Document Analysis Systems: Theory and Practice, LNCS vol. 1655, 1999, pp. 255-270.
Handley, J., Table Analysis for Multi-line Cell Identification. Proc. SPIE, the International Society for Optical Engineering, vol. 4307, Document Recognition and Retrieval VIII, Dec. 2000, pp. 34-43.
Kieninger et al., The T-Recs Approach for Table Structure Recognition and Table Border Determination. Proc. 6th Intl Conf. on Document Analysis and Recognition (ICDAR), Seattle WA, USA, Sep. 10-13, 2001, pp. 518-522.
Pinto et al., Table Extraction Using Conditional Random Fields. Proceedings of the 26th Annual International ACM SIGIR Conference on Research and Development in Informaion Retrieval (SIGIR '03), Toronto, Canada, Jul. 28-Aug. 1, 2003, pp. 235-242.
Wang et al., Table Structure Understanding and Its Performance Evaluation. Pattern Recognition, vol. 37, No. 7, Jul. 2004, pp. 1479-1497.
Mandal et al., A Simple and Effective Table Detection System from Document Images. International Journal of Document Analysis and Recognition (IJDAR), vol. 8, No. 2-3, Jun. 2006, pp. 172-182.
Hassan et al., Table Recognition and Understanding from PDF Files. Proc. 9th Intl. Conf. on Document Analysis and Recognition (ICDAR), Parana, Brazil, Sep. 23-26, 2007, vol. 2, pp. 1143-1147.
Oro et al., PDF-TREX: An Approach for Recognizing and Extracting Tables from PDF Documents. Proc. 10th Intl. Conf. on Document Analysis and Recognition (ICDAR), Barcelona, Spain, Jul. 26-29, 2009, pp. 906-910.
Shafait et al., Table Detection in Heterogeneous Documents. Proc. 9th IAPR Intl. Workshop on Document Analysis Systems (DAS), Boston, MA, USA, Jun. 9-11, 2010, pp. 65-72.
Deckert et al., Table Content Understanding in smartFIX. Proc. 11th Intl. Conf. on Document Analysis and Recognition (ICDAR), Beijing, China, Sep. 18-21, 2011, pp. 488-492.
Chen et al., Model-Based Tabular Structure Detection and Recognition in Noisy Handwritten Documents. Proc. 2012 Intl. Conf. on Frontiers in Handwriting Recognition (ICFHR), Bari, Italy, Sep. 18-20, 2012, pp. 75-80.
Ghanmi et al., Table Detection in Handwritten Chemistry Documents Using Conditional Random Fields. Proc. 14th Intl. Conf. on Frontiers in Handwriting Recognition (ICFHR), Crete, Greece, Sep. 2014, pp. 146-151.
Lee et al., Algorithms for Non-negative Matrix Factorization. Proceedings of the 13th International Conference on Neural Information Processing Systems (NIPS), pp. 535-541, 2000.
Wikipedia, Apache SystemML, https://en.wikipedia.org/w/index.php?title=Apache_SystemML&oldid=789525799, Jul. 7, 2017.
IBM: List of IBM Patents or Patent Applications Treated as Related, Aug. 30, 2021, pp. 1-2.

\* cited by examiner

TABLE RECOGNITION IN PORTABLE DOCUMENT FORMAT DOCUMENTS

FIELD

The present application generally relates to information technology, and, more particularly, to portable document format (PDF) document processing.

BACKGROUND

Automatic identification, separation, and parsing of tables in PDF documents are commonly important tasks in an enterprise content collection pipeline. Valuable high-precision data are often publicized in tables, such as those provided on the pages of financial and technical reports, for example. The challenge of table recognition, however, results, in part, from the diversity of such tables and documents. For example, tables can be small or large, with or without borders and separating lines, with mixed alignment (left, right, and center), with cells containing paragraphs, with multi-column or multi-row subtitles, with indentation and hierarchy, with headnotes and footnotes, etc. Additionally, there can be multiple tables on a page, co-aligned or not, with text in between the tables or not, and sometimes embedded inside a multi-column text layout that itself looks like a table. Further, table appearance differs greatly across numerous styles, subject matters, publisher regulations, source institutions, localities and time periods, and typesetting tools. However, existing document processing techniques do not include a table-specific machine readable markup in the PDF format; any such markup is generally omitted when a PDF file is generated.

SUMMARY

In one embodiment of the present invention, techniques for table recognition in PDF documents are provided. An exemplary computer-implemented method can include steps of discretizing one or more contiguous areas of a PDF document; identifying one or more white-space separator lines within the one or more discretized contiguous areas of the PDF document; detecting one or more candidate table regions within the one or more discretized contiguous areas of the PDF document by clustering the one or more white-space separator lines into one or more grids; and outputting at least one of the candidate table regions as a finalized table in accordance with scores assigned to each of the one or more candidate table regions based on (i) border information and (ii) cell structure information.

In another embodiment of the invention, an exemplary computer-implemented method can include steps of discretizing one or more contiguous areas of a PDF document by identifying, within the PDF document, (i) one or more text objects and (ii) one or more ruling lines; and creating one or more white-space separator lines within the one or more discretized contiguous areas of the PDF document based on the proximity of each of multiple candidate white-space separator lines to one or more of the identified text objects. Such a method can also include steps of detecting one or more candidate table regions within the one or more discretized contiguous areas of the PDF document by (i) clustering the one or more white-space separator lines into one or more grids and (ii) identifying one or more ruling line grids; identifying at least one of the candidate table regions as a finalized table in accordance with scores assigned to each of the one or more candidate table regions based on (i) border information and (ii) cell structure information; and generating and outputting a hypertext markup language file in accordance with each of the at least one finalized tables.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the invention includes techniques for table recognition in PDF documents. At least one embodiment of the invention includes discovering and separating all tables located on a page of a PDF document without the need for markup. Such an embodiment, as further detailed herein, includes processing virtual white-space lines that separate blocks of text, in addition to the printed ruling lines, and analyzing their intersection topology. Subsequently, such an embodiment can include identifying one or more tables by finding grids formed by these lines, while also pruning and cleansing the identified tables based on one or more heuristics. As used herein, "graphical lines" and "ruling lines" are used synonymously and/or interchangeably. Further, as used herein, a "ruling line" refers to a line or border physically present on the PDF page/document.

As detailed below, input data for such table recognition techniques can include a collection of text objects and ruling lines obtained from a PDF document and/or from an optical character recognition (OCR) system. Further, the output of such table recognition techniques can include a set of one or more rectangles located on the PDF document, wherein each rectangle represents a table boundary, in addition to vertical and horizontal separator lines and/or a set of rectangular cells inside each rectangle. In one or more embodiments of the invention, such an output can be subsequently converted into hypertext markup language (HTML) tags that define table structure.

Figure 1:
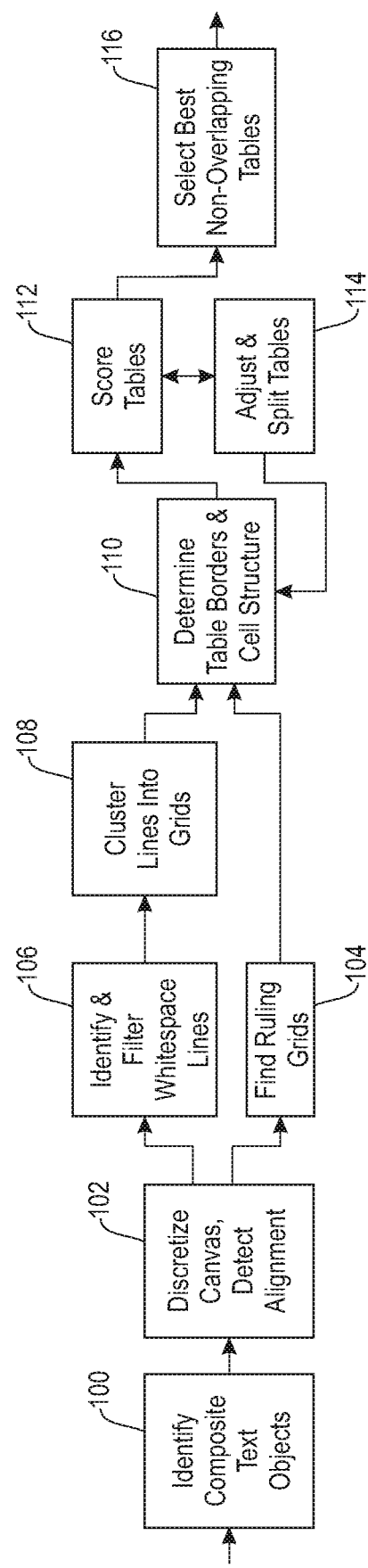
FIG. 1 is a diagram illustrating a table recognition algorithm, according to an exemplary embodiment of the invention.

FIG. 1 is a diagram illustrating an algorithm for table recognition in a PDF document, according to an exemplary embodiment of the invention. Step 100 includes identifying composite text objects, and step 102 includes discretizing a canvas and detecting alignment(s). Based on the outputs derived from step 102, step 106 includes identifying and filtering whitespace lines, and step 104 includes finding zero or more ruling grids. Based on the outputs derived from step 106, step 108 includes clustering lines into grids (via, for example, a non-negative matrix factorization (NMF), as further detailed herein), and based on the outputs derived from steps 104 and 108, step 110 includes determining table borders and cell structure.

Based on the determined borders and cell structure for one or more tables, step 112 includes scoring the tables, while step 114 includes adjusting and splitting one or more of the tables (if necessary; which can result in returning to step 110). Such a scoring step can include scoring tables using a weighted linear combination of rule-based features (such as text units near lines, text units in/around the table, etc.). Based on the table scores, step 116 includes selecting the best (for example, the highest scoring) non-overlapping tables. As further described herein, outputs of one or more embodiments of the invention (such as the algorithm depicted in FIG. 1) can also include, for each identified/selected table in the PDF page/document, a table bounding box, separator lines that define rows and columns, and cell structure information.

Additional details pertaining to the algorithm depicted in FIG. 1, including one or more variations and/or additional steps, will be further described herein.

For example, step 100 (identifying composite text objects) can include grouping text and/or characters in a PDF document into words (also referred to herein as tokens), grouping tokens into phrases, and grouping phrases into paragraphs. Additionally, step 102 (discretizing a canvas and detecting alignment(s)) can include discretizing one or more contiguous areas of the document, snapping and/or merging ruling lines (for example, ruling lines that are near each other), and detecting all aligned groups of phrase-units within each contiguous area. Also, step 104 (finding ruling grids) can include detecting zero or more candidate tables and/or table regions in each contiguous area of the document by finding all ruling-line grids and frames available within that area.

Further, by way of further example, step 106 (identifying and filtering whitespace lines) can include identifying one or more whitespace separator lines within the discretized contiguous areas of the document, and combining such lines with the available ruling lines. Step 106 can also include filtering out one or more of the whitespace separator lines that cannot serve as table boundaries or in-table separators, based on their relationship to phrase-units and one or more other lines. Additionally, step 108 (clustering lines into grids) can include detecting zero or more candidate table regions within each of the discretized contiguous areas of the document by clustering the area's white-space lines, ruling lines, and their pairwise intersections into one or more grids.

Also, for example, in connection with step 110 (determining table borders and cell structure), to convert each candidate table region into a table, at least one embodiment of the invention can include determining the table borders and cell structure by filtering and adjusting the ruling and white-space lines within that region. Additionally, step 112 (scoring tables) can include assigning a fitness score to each candidate table based on its size, borders, separators, row/column and cell structure, text blocks, adjustment options, and/or other features. Step 114 (adjusting and splitting tables) can include generating new candidate table regions by adjusting and/or splitting one or more of the previously identified candidate table regions. Further, step 116 (selecting the best non-overlapping tables) can include, for example, outputting zero or more finalized tables for each contiguous area of the document by selecting a non-overlapping sub-set of candidate tables with the maximum aggregated score.

Inputs for one or more embodiments of the invention (such as the algorithm depicted in FIG. 1) can include text objects such as tokens, phrases, paragraphs, blocks, etc., as well as ruling lines, on each PDF page/document in question. Each input text object is supplied with and/or represented by a vector of related features. As used herein a "token" refers to a word, a number, or a special symbol, while a "phrase" refers to an inseparable horizontal sequence of tokens (which can further be grouped into paragraphs, paragraph blocks, etc.). Features, by way merely of example, can include box coordinates, font name, font size, font color, font style/emphasis (bold, italics, etc.), capitalization, numeric character or non-numeric character, token count, text hash value, etc.

In at least one embodiment of the invention, the input data describe a collection of axis-parallel bounding rectangles containing objects on a canvas (that is, a contiguous area of the PDF document). Some of these rectangles may spatially overlap. In one or more embodiments of the invention, a canvas is one document page, but a canvas can also encompass multiple pages stitched together to detect multi-page tables. At least one embodiment of the invention can include utilizing a multi-canvas document, which requires multiple runs/iterations of the techniques detailed herein, which can be performed concurrently.

Each input object on a canvas can be a content object or a marker object. A content object can include, for example, a text object such as a word or a number, an image object such as a logo, or a derived type of content such as a chart. A marker object can include, for example, a printed ruling line or a colored background rectangle, interpreted as a collection of graphical lines. In one or more embodiments of the invention, each object has an associated feature vector that includes the coordinates (left, right, top, bottom) of its bounding box, as well as selected appearance and content features (such as, for example, font type, font size, font color, bold or not, italic or not, hash value, numeric or non-numeric, capitalized or not, special character or not, graphical line or not, etc.). Based on such inputs, at least one embodiment of the invention can be carried out via the following sequence of steps (also referred to herein as Algorithm 1, which will be further detailed below):

Step 1. Identify composite text objects;
    Step 2. Discretize canvas and detect alignment:
    Step 2.1. Find blocks of aligned text objects;
    Step 2.2. Discretize the canvas;
    Step 2.3. Snap, filter, and merge ruling lines;
    Step 3. Find ruling grids;
    Step 4. Identify and filter whitespace lines:
    Step 4.1. Generate virtual (whitespace) lines;
    Step 4.2. Score, filter, and de-duplicate all lines;
    Step 5. Cluster lines into grids:

Step 5.1. Run NMF to cluster lines;
Step 5.2. Identify potential table regions;
Step 6. Determine table borders and cell structure:
Step 6.1. Score, filter, and de-duplicate table lines;
Step 6.2. Determine cell structure;
Step 7. Score tables:
Step 7.1. Evaluate metrics over border shifts and table splits;
Step 7.2. Combine all metrics into one score;
Step 8. Adjust and split tables;
Return to Step 6 for every new (adjusted) table;
Step 9. Output the best non-overlapping subset of tables:
Step 9.1. Select the best non-overlapping subset of tables;
Step 9.2. Generate the output.

In connection with Step 1, identifying composite text objects, a composite text object refers to a grouping of spatially adjacent and semantically linked input text objects. Examples of such objects can include phrases of multiple highly-linked tokens, text lines spanning the length of a paragraph or a column, whole paragraphs, vertical blocks of plain text, footnotes, titles, bullet lists, etc. In one or more embodiments of the invention, it is assumed that a composite text object tends to occur either wholly inside one table cell, or not inside a table at all. In other words, such an embodiment discourages (but may not outright prohibit) the crossing of text objects by table grid-lines.

To avoid negative effects on table accuracy, in Step 1 of at least one embodiment of the invention, composite text objects can be detected conservatively, rejecting all ambiguous cases. Some composite text objects may be provided as part of the input, identified elsewhere in the workflow, while others may be identified by the table recognition algorithm.

Composite text objects can be identified via one or more heuristic rules. For example, phrases can be identified from tokens (words) based on proximity: if two tokens are close to one another, they are put into the same phrase. If a sequence of tokens has the same exact distance between each adjacent pair of tokens, such tokens may also be merged into one phrase. If two adjacent tokens have an obvious semantic relationship (for example, "$1000"), such tokens may be put into the same phrase as well.

Paragraphs can be identified based on a number of features. For example, in at least one embodiment of the invention, it is expected that paragraph text-lines share the same font characteristics, are vertically close, and are left-co-aligned except for the first line, which may have an indentation. Such an embodiment can include checking if there are vertical whitespace rectangles running through the candidate paragraph; if yes, it is not a paragraph. Such an embodiment may also include checking for evidence of paragraph typesetting; for example, a word is carried over to the next text-line if the word would not fit in the previous text-line.

In one or more embodiments of the invention, text objects form a hierarchy that is constructed bottom-up, aggregating the features of their constituent elements. The number of higher-level text objects is commonly smaller than the number of lower-level text objects, which helps to reduce the complexity of table recognition. Additionally, composite text object identification can improve the accuracy of table recognition by leaving fewer false positive options.

As noted above, Step 2 includes discretizing the canvas and detecting alignment. In connection with Step 2.1, finding blocks of aligned text objects, some of the text objects can be identified as left-aligned (top-aligned), right-aligned (bottom-aligned), or center-aligned with each other, either horizontally or vertically. As used herein, two rectangles are "aligned" if they nearly match by a certain coordinate. Also, in one or more embodiments of the invention, each kind of alignment is an equivalence relation that partitions the set of text objects (of each type) into disjoint equivalence classes, referred to herein as alignment blocks. Because, in many documents, alignment is not precise, at least one embodiment of the invention can include heuristically defining alignment tolerance thresholds. Additionally, an alignment relation can be expanded by transitivity. Further, to prevent over-expanded transitivity chains from labeling distant text objects as aligned, one or more embodiments of the invention include breaking-up some alignment classes based on co-location along the orthogonal axis, using additional thresholds and heuristics.

In connection with Step 2.2, discretizing the canvas, at least one embodiment of the invention includes selecting a type (a hierarchy level) of conservative text objects (for example, phrases), and using the selected objects to induce canvas discretization. The bounding rectangle of each object is projected to both the X-axis and the Y-axis, which produces an interval with one opening position and one closing position. In one or more embodiments of the invention, the bounding rectangles of text objects are projected onto the X-axis and onto the Y-axis. Each rectangle, when projected to an axis, becomes an interval defined by two positions: the "opening" position and the "closing" position. On the X-axis, the "opening" position is the left-most point and the "closing" position is the right-most point on the interval. On the Y-axis, the "opening" position is the top-most point and the "closing" position is the bottom-most point on the interval. (In a PDF document, larger Y-coordinates can correspond to lower positions on a page.) In general, the "opening" position is the minimum-coordinate position and the "closing" position is the maximum-coordinate position.

Figure 2:
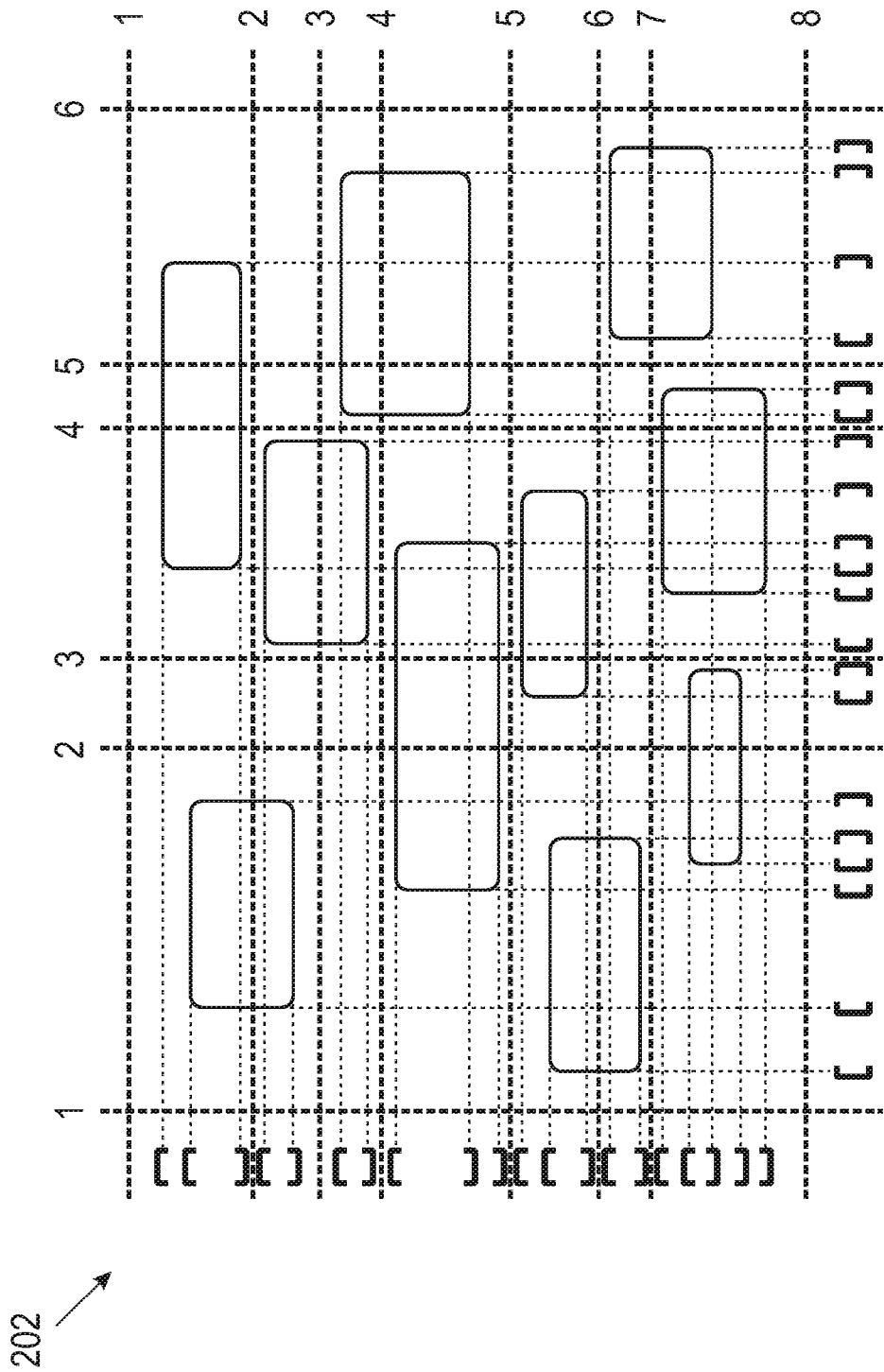
FIG. 2 is a diagram illustrating a discretization process, according to an exemplary embodiment of the invention.

By way of illustration, FIG. 2 is a diagram illustrating a discretization process 202, according to an exemplary embodiment of the invention. As depicted in FIG. 2, the opening brackets represent the "opening" positions, and the closing brackets represent the "closing" positions of bounding rectangle projections.

Additionally, on each axis, one or more embodiments of the invention includes sorting these positions, then identifying all places where a sequence of closing positions changes to a sequence of opening positions. In all such identified places, one discretization grid position is assigned between the last closing position and the first opening position. Additionally, on each axis, such an embodiment can also include assigning two more discretization grid positions, one before all of the noted intervals and one after all of the noted intervals. By way merely of illustration, consider the X-axis in FIG. 2, which holds the projection intervals of ten bounding rectangles. If "*" represents the discretization grid positions, "[" represents the interval opening positions, and "]" represents the interval closing positions, their ordering on the X-axis will be as follows: * [[[[ ]]*[ ]*[[[ ]]]*[ ]*[ ]]]*. Once the discretization grid is defined, one or more embodiments of the invention include recalculating all text object bounding rectangles (but not graphical ruling lines) in terms of this discretization as follows: each bounding rectangle is expanded to its nearest discretization-grid positions.

In connection with Step 2.3, snapping, filtering and merging graphical lines, to filter or clean-up the graphical (ruling) lines present on the canvas, includes step 2.3.1 and step 2.3.2. Step 2.3.1 includes converting solid-color rectangles into ruling lines, which can include sub-steps of merging touching or overlapping same-color rectangles, removing certain rectangles irrelevant to tables (for example, text highlighting or emphasis, page margins, etc.), and converting narrow rectangles into single ruling lines, and wider rectangles into sets of four lines. Step 2.3.2 includes processing the ruling lines, which can include sub-steps of merging broken or closely spaced lines and/or lines made of multiple parallel pieces, removing certain lines irrelevant to tables (for example, page borders, underscores, lines around non-table objects, etc.), grouping the ruling lines into connected components, allowing for tolerance in contact determination, and snapping the ruling lines into the discretization grid.

By way of additional illustration, the above-noted sub-steps of Step 2.3 can be expressed via a pseudocode sequence as follows:

Step 2.3. Snap, filter, and merge ruling lines:
Step 2.3.1. Convert solid-color rectangles into ruling lines:
  Sub-step i. Merge touching or overlapping same-color rectangles;
  Sub-step ii. Remove certain rectangles irrelevant to tables (for example, text highlighting, page margins, etc.); and
  Sub-step iii. Convert narrow rectangles into single ruling lines, and wider rectangles into sets of four lines; and
Step 2.3.2. Process the ruling lines:
  Sub-step i. Merge broken or closely spaced lines and/or lines made of multiple parallel pieces;
  Sub-step ii. Remove certain lines irrelevant to tables (for example, page borders, underscores, lines around non-table objects, etc.)
  Sub-step iii. Group the ruling lines into connected components, allowing for tolerance in contact determination; and
  Sub-step iv. Snap the ruling lines into the discretization grid.

As noted above, subsequent to processing the ruling lines, at least one embodiment of the invention includes "snapping" each ruling line into a discretization grid by replacing its real-valued coordinates with integers that specify discretization grid positions. For example, assume that each ruling line has three coordinates, such as a horizontal line having one Y-coordinate and two X-coordinates. Each discretization grid position (on the X-axis and on the Y-axis) comes with an interval of real-valued coordinates that "snap" into that position. For each line coordinate, one or more embodiments of the invention can include checking which interval the line coordinate falls into, and "snapping" the line coordinate into the corresponding discretization position.

Note that the lines can be grouped into connected components before they are snapped. This can be carried out, for example, because snapping can be too aggressive. For example, if two adjacent ruling-line tables have no text between them, their non-overlapping borders may "snap" into overlapping lines. Once a connected component identifier (ID) has been assigned to each line, at least one embodiment of the invention can include keeping the lines separate after they "snap" into the same position. Such connected components are then used in Step 3 (finding ruling grids).

Note also that the bounding boxes of text objects can be "snapped" into the discretization grid by expanding each bounding box to its nearest discretization grid positions. Thus, "snapping" may cause ruling lines to become shorter or longer, but bounding boxes can only become longer, so that table separator lines do not accidentally cross the original bounding boxes.

At least one embodiment of the invention can also include preserving intersections between the discretized lines, sometimes even if the original lines do not touch (but come close to touching). Also, one or more embodiments of the invention include recursively analyzing intersections among the graphical lines and labeling each graphical line with an intersection score based on how many intersections the graphical line has with other graphical lines and the intersection scores of those graphical lines. A graphical line that appears to be a part of a graphical table grid receives a higher intersection score, and as such, has more weight for table identification.

In connection with Step 3, finding ruling grids, zero or more candidate tables and/or table regions can be detected in each contiguous area of the document by finding all ruling-line grids and frames available within that area. At least one embodiment starts with the ruling-line-connected components identified in Step 2.3, and promotes some of those components to ruling-line grids and/or ruling-line frames if such components pass one or more additional tests.

By way merely of example, one such test is described as follows. Let (H, V) be a ruling-line connected component, wherein H denotes the set of horizontal lines and V denotes the set of vertical lines. A grid is referred to as a (k, m)-grid if there exist subsets H' of H and V' of V such that each ruling line in H' touches at least m ruling lines in V', and each ruling line in V' touches at least k ruling lines in H'. The largest such sub-sets H' and V' can be computed by iteratively removing from H and V the ruling lines that touch too few orthogonal lines. The connected component (H, V) passes the test if the component is either a (3, 4)-grid or a (4, 3)-grid.

In a ruling-line grid, both the table region and the cell structure are defined by the grid's ruling lines; in a ruling-line frame, its ruling lines define only the table region, but not the cell structure (which may need white-space lines too). It is common to see tables with seemingly perfect ruling-line grids where, in fact, many separator lines are not provided as ruling lines. In one or more embodiments of the invention, additional tests are run to differentiate between ruling-line grids and ruling-line frames. For example, such an embodiment can include testing for the presence of multiple numerical phrases in ruling-grid cells, which would suggest multiple actual cells within a single ruling-grid cell. Additional tests for ruling grids versus ruling frames occur at table scoring (in Step 7).

As noted above, Step 4 includes identifying and filtering whitespace lines. In connection with Step 4.1, generating virtual (whitespace) lines, given the discretization grid and a type (a hierarchy level) of text objects, at least one embodiment of the invention includes generating maximum-length line segments that overlap up to a given number of these text objects. For example, such an embodiment can include generating all maximum length line segments that cross 0 or 1 phrases and 0, 1, or 2 paragraphs.

With respect to the "maximum-length," assume a discretization grid, and assume that all text bounding boxes have been expanded to their nearest discretization grid positions. Accordingly, at least one embodiment of the invention can include generating all vertical and horizontal lines, permitted by the discretization grid, that overlap a given number of phrase bounding boxes, paragraph bounding boxes, etc. To reduce the resulting set of lines, such an embodiment can include generating only the lines that are not contained in other lines; that is, the maximum-length lines. By way of example, consider all vertical lines with X=10 (discretization position #10 on the X-axis), with the Y-axis having 20 discretization positions. If no phrase intersections are allowed, and there are two phrases crossing X=10 at intervals Y=[5, 7] and Y=[12, 15], an example embodiment of the invention can include generating lines with Y=[1, 5], Y=[7, 12], and Y=[15, 20]. Note that a line with Y=[8, 11] also has zero phrase intersections, but it is not a maximum-length line because it is contained in the line with Y=[7, 12]; hence, such a line would not be generated.

One or more embodiments of the invention can also include, as virtual lines, all graphical lines after having them filtered/cleaned-up and discretized. The sparsity of a discretization grid and the maximum length constraint on generating the lines can ensure that the number of virtual lines generated is limited.

In connection with Step 4.2, scoring, filtering/cleaning-up, and de-duplicating all lines, a sequence of sub-steps can be iteratively (in a loop) applied, as outlined below. The exact order of the sub-steps can depend on the specific implementation and may vary, as the sub-steps can affect each other. A first sub-step includes measuring the proximity of the lines to text objects, to test if a virtual line is a possible table separator, the degree of proximity between the line and each nearby text object is measured. At least one embodiment of the invention includes determining if the line passes near enough to the text object to potentially border a table cell containing the object. The degree of proximity between the line and the object can depend on other virtual lines and text objects that may serve to interfere with such a bordering arrangement. Such an embodiment can include determining if the line faces the object; that is, determining whether the area between the line and the text object is free from other text objects. Additionally, such an embodiment can also include counting how many parallel line positions between the line and the text object are occupied by other virtual lines that face the object in a more proximate position.

A second sub-step includes applying rules to find possible table separators, for each virtual line, and at least one embodiment of the invention includes applying a collection of heuristic rules that indicate whether the line appears to be a part of a table grid. Example heuristic rules can include rules that look at the line's length, the width of its surrounding empty space (that is, the line's margin), the number and the type of text objects crossed or faced by the line, etc. Additionally, example heuristic rules can also include rules that determine if the line overlaps (or lies in, contains, or equals) a graphical line with a certain intersection score. Further, other example heuristic rules can also include rules that look for property-sharing groups of text objects faced by the line. For instance, such a rule can indicate that if a vertical line faces a right-aligned group of four numerical values and passes near to them, then it is likely to be a table separator.

To define a qualifying group of line-facing text objects, each such rule specifies (i) the required number or density of text objects in the group, (ii) the group's required degree of proximity to the line, (iii) which property or properties must be shared by all text objects within the group, and (iv) one or more other conditions on the group and on its relationship to the line. For example, such rules can respond to groups of 2-5 aligned text objects sharing the same font features, hash value, type of textual contents, etc.

The above paragraph describes how a typical rule works, for deciding if a virtual line can be part of a table. A "qualifying group" of nearby text objects is what triggers the rule. Consider, for example, a vertical line (segment); the line has some text objects (for example, phrases) on its left and on its right. At least one embodiment of the invention can include only considering the text objects that "face" the line segment; that is, text objects in direct unobstructed view of the line. Each rule specifies a property of text objects, such as, for example, "right-aligned and having the same font." The property assigns a value to each text object, such as, for example "right-alignment group ID and font ID." The objects with the same property value form a property-sharing group; in the above example, phrases that are mutually right-aligned and share the same font form a group. Besides the property, a typical rule can also specify the required group size (or density), the required distance between the line and the group, and/or one or more other conditions. A property-sharing group is referred to herein as "qualifying" if the group satisfies all requirements of the rule. In the above example, this can include a group of at least four right-aligned same-font phrases that "face" the line at proximity level two or less. If such a group exists, the rule is triggered.

A third sub-step includes scoring and pruning the lines by combining all rules, the results of all rules (described above) are combined to determine if the line should be rejected (as unfit for a table), accepted (kept for now), or conditionally accepted pending intersection tests. At least one embodiment of the invention can include combining the rules using a weighted linear combination or a logical expression. Weights of the individual rules, and/or their conjunctive clauses, can be manually specified, or can be learned with a supervised machine learning algorithm.

A fourth sub-step includes adjusting the lines based on their intersections, at least one embodiment of the invention includes recursively analyzing the intersections between all non-rejected virtual lines, and rejecting one or more additional virtual lines and/or conditionally accepting one or more additional lines based on the intersection patterns of the lines. The rejection process can be iterative: at each step, one or more embodiments of the invention include computing the lines' intersection scores, rejecting all lines whose intersection scores are below a pre-determined threshold, and subsequently trimming and de-duplicating the remaining lines. Additionally, in one or more embodiments of the invention, all lines with zero or one intersection can be rejected, as well as one or more certain types of other lines. Also, all lines can be trimmed to start and end at an intersection (that is, trim the hanging tails of lines). Further, in at least one embodiment of the invention, a conditionally accepted line can be promoted to accepted if the line intersects with more than a pre-determined minimum number of accepted lines.

A fifth sub-step includes de-duplicating lines, at least one embodiment of the invention includes de-duplicating the available lines to avoid multiple parallel lines with the same relationship to nearby text objects. For example, two parallel lines with the same start position and end position are duplicates if every text object (of a certain type, such as, for example, phrase) is on the same side of both lines and/or crossed by both lines. In one or more embodiments of the invention, one line from each set of duplicate lines can be retained, preferably a line that overlaps graphical lines. Further, at least one embodiment of the invention can also include performing one or more additional steps such as, for example, computing a coarser discretization grid (as in Step 2.2 of Algorithm 1) over a smaller canvas area and merging lines over this coarser grid, and/or removing a shorter line functionally subsumed by a longer line.

The above-noted sub-steps may run until convergence (that is, until there are no more changes to the lines), or the sub-steps may run a fixed number of iterations. Note that rejection or de-duplication of some lines may invalidate the rejection of other parallel lines. For example, other parallel lines may measure closer to important groups of text objects and score higher. Accordingly, such lines can be protected from early erroneous rejection.

By way of additional illustration, sub-steps, similar to those detailed above, of Step 4.2 can be expressed via a pseudocode sequence as follows:

Step 4.2. Score, filter, and de-duplicate all lines:
Iterate the following sub-steps:
Sub-step 1. Measure proximity of the lines to their adjacent text objects;
Sub-step 2. Apply rules to test which of the lines are possible table separators:
For each line:
    Sub-step 2.1. Identify property-sharing groups of adjacent text objects; and
    Sub-step 2.2. Evaluate rules based on (a) line properties, and (b) adjacent text properties;
Sub-step 3. Classify the lines by aggregating the scores of all triggered rules;
Sub-step 4. Prune and trim the lines based on their scores and intersections with each other:
    Sub-step 4.1. Promote the lines that intersect with many high-scoring lines;
    Sub-step 4.2. Remove low-scoring and poorly intersecting lines; and
    Sub-step 4.3. Trim the remaining lines so that they start and end at an intersection; and
Sub-step 5. De-duplicate the lines.

As noted above, Step 5 of Algorithm 1 includes clustering lines into grids. In connection with Step 5.1, running non NMF to cluster lines, at least one embodiment of the invention includes representing the network of line intersections via a superposition of grids. At the start of this step (after Steps 1-4), only the virtual lines that are likely to pass through one or more table regions have been maintained. Additionally, one or more embodiments of the invention include assuming that orthogonal lines passing through the same table region are likely to intersect with each other, as in a grid. Conversely, outside table regions, such lines can be expected to intersect rarely, if ever. Although parallel lines often pass through the same two or more table regions, one or more embodiments of the invention include assuming that each pair of orthogonal lines generally share at most one table region (if intersecting, exactly one region).

By way of illustration, let $U[i, r]=1$ if horizontal line i passes through table region r, and let $U[i, r]=0$ horizontal line i does not pass through table region r. Analogously, let $V[j, r]=1$ if vertical line j passes through table region r, and let $V[j, r]=0$ if vertical line j does not pass through table region r. The product $U[i, r]*V[j, r]$ is 1 if both lines i and j pass through the same region r, and 0 otherwise. Also, let k be the number of table regions. Accordingly, it is expected that the sum $U[i, 1]*V[j, 1]+U[i, 2]*V[j, 2]+ \ldots +U[i, k]*V[j, k]$ would normally be 1 when lines i and j intersect, and 0 when lines i and j do not intersect. In matrix notation, it is expected that matrix product $UV^T$ would approximate the intersection matrix X, where $X[i, j]=1$ if lines i and j intersect and $X[i,j]=0$ if lines i and j do not intersect.

In connection with Step 5.1, given the intersection matrix X, an example embodiment of the invention can include setting the number of table regions k to 1, 2, ..., up to a fixed maximum, and using NMF to approximate X with the product $UV^T$ of two matrices, U and the transpose $V^T$, whose cells are nonnegative. The k columns of matrices U and V represent the (unknown) table regions, the rows of U are for the horizontal lines, the rows of V are for the vertical lines, and the cells $U[i, r]$ and $V[j, r]$ contain affiliations between lines and table regions. Note that one line can be affiliated with multiple table regions. Also, each intersection between two lines, say i and j, can additionally receive affiliations with the table regions: $X[i,j]=1$ is approximated by $U[i, 1]*V[j, 1]+U[i, 2]*V[j, 2]+ \ldots +U[i, k]*V[j, k]$, wherein each non-negative product $U[i, r]*V[j, r]$ gives the intersection's affiliation with table region r.

As used herein, an "affiliation" of a line to a cluster is a non-negative value, such as $U[i, r]$ or $V[j, r]$, returned by the NMF algorithm. Most of these affiliations are going to be fractional. Affiliations help predict if two lines intersect or not, because their matrix product $UV^T$ approximates the intersection matrix X. Two lines highly affiliated to the same cluster are likely to intersect, and vice versa. Indeed, each cell $X[i, j]$ can be approximated by sum-product $U[i, 1]*V[j, 1]+U[i, 2]*V[j, 2]+ \ldots +U[i, k]*V[j, k]$. Two lines i and j have large affiliations $U[i, r]$ and $V[j, r]$ to the same cluster r if there is a large product $U[i, r]*V[j, r]$ that more likely approximates 1 rather than 0.

Here, k is the number of clusters (table regions). For example, for the purposes of this illustration, assume k=3. NMF requires that $U[i, r]$ and $V[j, r]$ are non-negative for every i, j, and r=1, 2, 3. It is not known in advance what $U[i, r]$ and $V[j, r]$ will be, as are computed by NMF. Accordingly, for k=3:

If line #i does not intersect line #j, then $U[i, 1]*V[j, 1]+U[i, 2]*V[j, 2]+U[i, 3]*V[j, 3]$ approximates 0; and
If line #i intersects line #j, then $U[i, 1]*V[j, 1]+U[i, 2]*V[j, 2]+U[i, 3]*V[j, 3]$ approximates 1.

A sum of non-negative values approximates 0 only if each non-negative value is close to 0; that is, products $U[i, 1]*V[j, 1]$, $U[i, 2]*V[j, 2]$, and $U[i, 3]*V[j, 3]$ are all close to 0. That can only happen if:
In $U[i, 1]*V[j, 1]$, either $U[i, 1]$ or $V[j, 1]$ is close to 0; and
In $U[i, 2]*V[j, 2]$, either $U[i, 2]$ or $V[j, 2]$ is close to 0; and
In $U[i, 3]*V[j, 3]$, either $U[i, 3]$ or $V[j, 3]$ is close to 0.

A sum of non-negative values approximates 1 only if at least one of the values is far from 0. That can only happen if:
In $U[i, 1]*V[j, 1]$, both $U[i, 1]$ and $V[j, 1]$ are far from 0; or
In $U[i, 2]*V[j, 2]$, both $U[i, 2]$ and $V[j, 2]$ are far from 0; or
In $U[i, 3]*V[j, 3]$, both $U[i, 3]$ and $V[j, 3]$ are far from 0.

Further, in such an illustrative example, consider three clusters of lines, such that $U[i, r]$ and $V[j, r]$ are the affiliation of horizontal line #i and vertical line #j to cluster r (r=1, 2, or 3). Now, if two lines, #i and #j, both have high affiliation to the same cluster (1, 2, or 3), the sum-product expression above will be far from 0, predicting that the lines intersect. If there is no cluster to which both #i and #j have a high affiliation, then the sum-product expression will be close to 0, predicting that the lines do not intersect.

If, for example, there are three areas on the page where horizontal and vertical lines intersect considerably, it is likely that clusters 1, 2, and 3 will reflect these areas, and the affinity of a line to a cluster will reflect the overlap between the line and one of these areas. If two lines overlap the same area, they are likely to intersect; otherwise they are likely to not intersect.

In connection with Step 5.2, at least one embodiment of the invention can include using the lines' affiliations and their intersections' affiliations to identify potential table regions. For each potential region r, such an embodiment includes selecting the lines that are significantly affiliated (or affiliated beyond a pre-determined threshold amount) with r. It is acceptable for such lines to affiliate with, and pass through, other regions besides r. Additionally, such an embodiment includes considering all intersections involving at least one of these lines (also referred to herein as "qualified" intersections). For each intersection, say of lines i and j, one or more embodiments of the invention include defining a value D[i, j] such that D[i, j]>0 if and only if the intersection is predominantly affiliated with r. The value D[i, j] is defined through comparing the intersection's affiliation U[i, r]*V[j,r] to the sum of affiliations U[i, 1]*V[j, 1]+U[i, 2]*V[j, 2]+ . . . +U[i, k]*V[j, k]. The exact definition of D[i, j] and of being significantly and/or predominantly affiliated can depend on the implementation and may vary in one or more embodiments of the invention.

Further, at least one embodiment of the invention includes looking for a rectangular area on the canvas that maximizes the aggregated D[i, j]-values across all qualified intersections inside the area. For efficiency, such an embodiment can include optimizing the area's axial projections separately: D[i, j]-values can be aggregated along the selected vertical (and separately, horizontal) lines to find the maximizing horizontal (and separately, vertical) interval. These two intervals can define the initial rectangle for potential region r. The discovered potential table regions can, in one or more embodiments of the invention, occasionally overlap even for the same value of k and/or across different values of k. Because k values are not known in advance, such an embodiment can include running the above process for different k values and collecting all discovered regions, overlapping or not.

At the start of Step 6, there is a collection of potential table regions (possibly overlapping), ruling lines, and whitespace lines. Some potential table regions can be ruling grids and ruling frames identified in Step 3, and some can be clustering-based regions identified in Step 5. These regions are organized into a queue. Steps 6, 7, and 8 work in a loop, processing one region, or one batch of regions, at a time, taking these regions from the front of the queue; Step 8 can add new regions to the back of the queue. The loop ends when the queue is empty or when some form of a time limit is reached. As noted above, Step 6 includes determining table borders, row/column separators, and cell structure given the regions, Step 7 includes assigning fitness scores to potential tables, and Step 8 includes adjusting and splitting potential table regions, creating zero or more new potential table regions while retaining the previously identified potential tables. All potential tables with cell structure and scores are saved separately, and are later made available to Step 9.

In connection with sub-step 6.1, scoring, filtering, and de-duplicating table lines, at least one embodiment of the invention includes trimming all lines accepted in Step 4 to fit inside the given table region, then running a procedure analogous to Step 4.2 using the given region as the canvas. For ruling grids, the table lines are the ruling lines associated with these grids in Step 3, with no additional filtering. With respect to de-duplicating lines, sub-step 6.1 is less conservative and uses additional steps described herein to consolidate lines. In particular, sub-step 6.1 can run a canvas discretization procedure similar to Step 2.2, but over the table region as the canvas (rather than the whole page), which produces a coarser discretization grid induced only by the text objects inside the table region. Then, sub-step 6.1 can "snap" table separator lines to this coarser grid and merge parallel lines that touch or overlap after the "snapping." The outer lines of the table can be identified as the table's border.

In connection with sub-step 6.2, determining cell structure, the vertical and horizontal lines in each potential table region are converted to a collection of disjoint rectangular cells. Note that, initially, the lines may surround some non-rectangular areas. If a connected area surrounded by the lines is not rectangular, it is also not convex and has at least one "non-convex corner" along its boundary. At least one embodiment of the invention iteratively finds all connected areas and their "non-convex corners," then extends the lines involved in "non-convex corners" until they touch orthogonal lines (or table borders), potentially splitting the non-rectangular connected area into several areas. This process continues until all connected areas are rectangular; once it terminates, some cell boundaries can be removed (if the merged cells remain rectangular), such as, for example, the cell boundaries that cross phrases or create redundant empty cells.

In connection with Step 7, scoring each table, at least one embodiment of the invention includes evaluating each table by comparing the location, formatting, and other features of its parts, such as cells, text blocks and line segments, to a set of one or more assumptions about how a well-formed table looks. As further detailed herein, such assumptions can include the following:

(1) Cells whose projections overlap each other in one dimension are expected to subsume each other in that dimension; that is, one cell has to project fully inside, or fully outside, the other cell;

(2) Densely-aligned blocks of phrases are expected to sit fully inside or fully outside of a table; hence, table borders can be penalized for crossing such blocks; and (3) If there is a group of aligned phrases in the lower half of the table, more phrases from this group are expected in the upper half of the table; hence, if a split-line is drawn across the middle of the table and a group of aligned phrases are found entirely on one side of the split-line, the table is penalized.

The last two examples represent "dense parts" (the second example) and "sparse parts" (the third example). As used herein, a "dense part" refers to something that should sit fully inside or fully outside of the table. Additionally, as used herein, a "sparse part" refers to something that, if present in one half of the table, should stretch into the other half of the table. For example, a graphical line can be deemed a "dense part" because the graphical line should not cross a table border. Additionally, for example, a virtual separator line can be deemed a "sparse part" because separator lines are expected to stretch across most of the table. In at least one embodiment of the invention, the same part can be treated as both "dense" and "sparse;" that is, such a part can contribute to both types of penalties.

Additional assumptions can include, for example, that a table's borders are likely to include a ruling line and/or a wide white-space margin, and that a table is expected to have most of its cells populated (non-empty), and that almost all table cells are expected to contain at most one numerical value. If too many cells contain multiple numerical values, the table may have incorrectly merged rows or columns. At least one embodiment of the invention can include implementing a special penalty for such an erroneous merging of rows or columns.

Based on these assumptions, such an embodiment can include defining two (overlapping) classes of table parts: dense and sparse. Dense parts are expected to sit fully inside or fully outside of the table, never crossing its border. Sparse parts, if significantly present inside of a table, usually span most of the table's length end-to-end. For example, an unbroken sequence of mutually aligned text objects (cell values) may be short or long, but such a sequence rarely crosses a table border, so it would be considered a dense part. On the other hand, a virtual white-space line present in a table is a sparse part, as such a line may cross the table border, but the line tends to span either most of the table (a separator) or very little of the table.

Additionally, in one or more embodiments of the invention, non-compliant parts generate a penalty for a table directly, via a border adjustment search, and via a split-line search. Because at least one embodiment of the invention includes utilization of a discretization "master grid," there can be relatively few positions to draw a line parallel and co-aligned to a table border. Accordingly, such an embodiment can include trying all possible ways of shifting a table border in the orthogonal direction (border adjustment), as well as drawing a line across the table, which is referred to herein as a split-line because it splits the table into two portions. For every split-line, at least one embodiment of the invention can include computing the score of splitting the table along this line. Subsequently, such an embodiment includes selecting the best (highest scoring, for example) vertical and horizontal adjusted border and/or split-line, and using their scores as part of the table's score. If there is a successful means of adjusting or splitting the table, the table's score should decrease because that is an indication that the table is not a well-formed table (it could be two well-formed tables, for example).

Additionally, the table gets a direct penalty for each dense part that crosses the table's border and for each sparse part that spans just a fraction of the table's area. Also, at least one embodiment of the invention includes searching for the best split of the table by a split-line, trying multiple (or, in some instances, all) discretization grid positions. A split-line generates a penalty for each dense part it crosses, and generates a reward for each sparse part whose span nearly matches one side of the split. The reward can be scaled down if the split-line is close to a table border, creating a highly imbalanced split. Also, one or more embodiments of the invention can include selecting the split-line with the best aggregated score, and if the score is positive, using the score as a penalty for the table.

In at least one embodiment of the invention, each adjusted border's score or split-line's score is the sum of four parts: a cell structure penalty, a dense-parts penalty, a sparse-parts gain, and the line's own score. A cell structure penalty is the sum of all penalties for cell structure violations caused by the proposed adjustment or split. A dense-parts penalty is the sum of all penalties for crossing "dense parts," such as ruling lines and densely-aligned blocks of phrases. A split-line that crosses "dense parts" is unlikely to be a border between two tables. A sparse-parts gain is the sum of all gains from "sparse parts" that are found on only one side of the split-line. A good split-line should partition the table into two very different parts, with different alignments, separator lines, etc. (However, a sparse-parts gain can be discounted if the split-line is far from the middle of the table.) Finally, the line's "own" score credits a split-line if the split-line has a wide white-space margin, coincides with a ruling line, etc.; that is, if the split-line looks like a natural place to consider splitting.

In connection with Step 8, adjusting and splitting candidate tables, an adjusted border and/or split-line for each table can be identified. In the latter instance, at least one embodiment of the invention can include generating two table regions covering both sides of the split-line, and adding the two table regions to the queue for (re-)execution of Step 6. Such an embodiment can also include expanding or contracting a table region by border adjustment, for example, if the region's border crosses multiple dense parts. Further, in one or more embodiments of the invention, the original table can remain for final selection, while the adjusted table region can be added to the queue.

As such, Step 9 includes outputting the best non-overlapping candidate tables. In connection with Step 9.1, selecting the best non-overlapping subset of candidate tables, at least one embodiment of the invention includes using exponentiated candidate table scores as appreciation or depreciation factors multiplied to table sizes, and selecting a non-overlapping sub-set of candidate tables having the largest aggregate appreciated/depreciated size. Table size and overlap size can be measured, for example, as the aggregated weight of the text objects present inside the candidate table (for size) or in both candidate tables at once (for overlap). The option of not having any table can also be given a score, so that this option competes with the candidate tables.

In connection with Step 9.2, producing an output, for each table, Step 9.2 involves (i) mapping all grid positions to coordinate intervals, (ii) linking table content objects and graphical lines with their cells, and (iii) generating an output representation, for example, which can be converted to extensible hypertext markup language (XHTML), to document structure model (DSM), and/or to some other representation as required by downstream process modules.

In one or more embodiments of the invention, most of Algorithm 1 (for example, all steps except Steps 1 and 9.2) can be implemented in a language called declarative machine learning language (DML), compiled and executed by Apache SystemML. DML is neither a procedural nor an object-oriented language, but is a functional language intended for machine learning algorithms.

Figure 3:
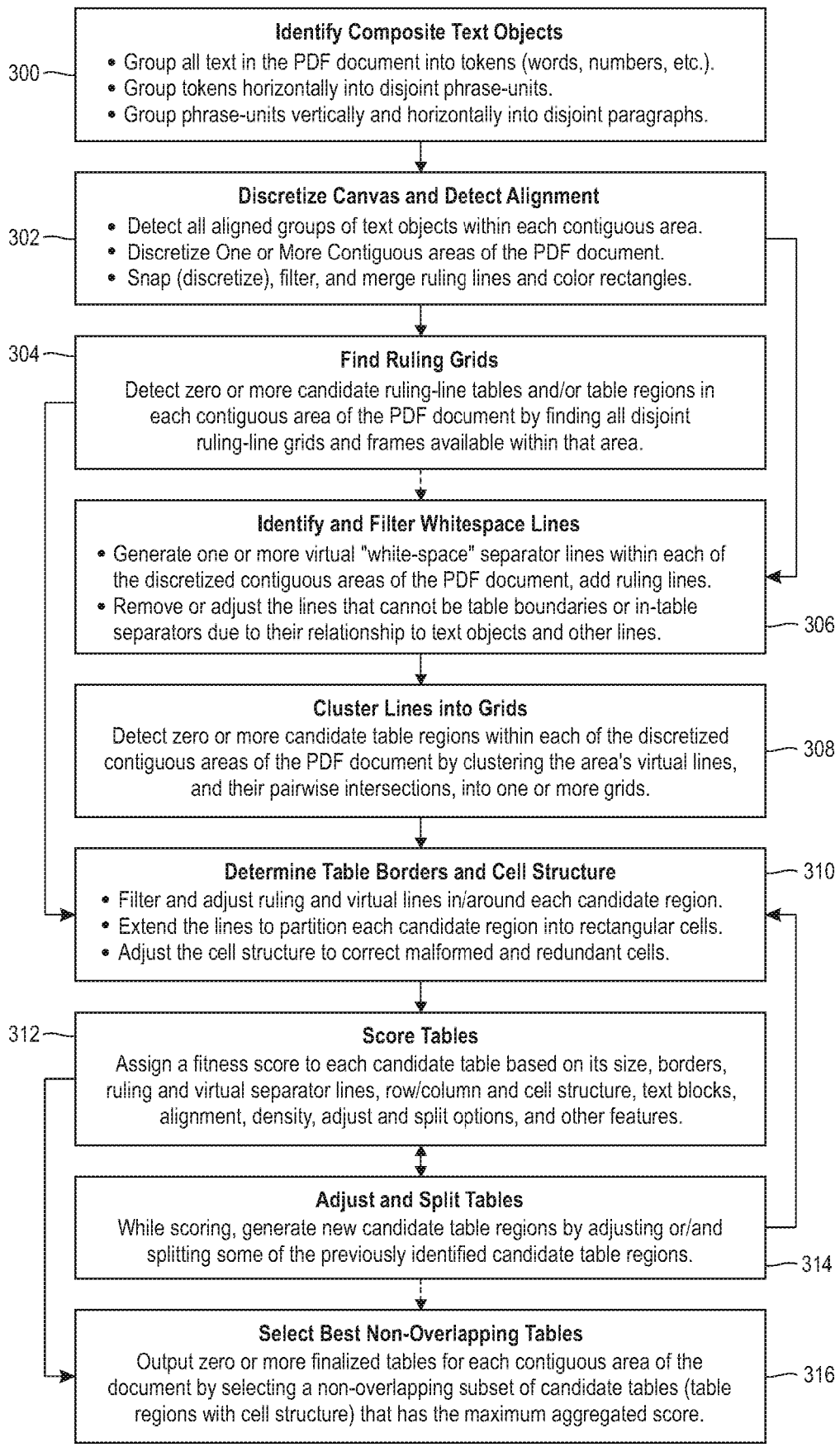
FIG. 3 is a flow diagram illustrating techniques according to an embodiment of the invention.

FIG. 3 is a flow diagram illustrating techniques according to an embodiment of the present invention. Step 300 (corresponding to Step 1 of Algorithm 1) includes identifying composite text objects in a PDF document. Composite text objects can be organized into a hierarchy, in which upper-level text objects are composed of one or more lower-level text objects. Such a hierarchy can include tokens, phrase-units, and paragraphs. Tokens (such as words and numbers) are composed of characters, phrase-units are composed of tokens, and paragraphs are composed of phrase-units. Identifying composite text objects can proceed in a bottom-up fashion, wherein all characters in the PDF document are grouped into disjoint tokens, then tokens are grouped horizontally into disjoint phrase-units, and then phrase-units are grouped vertically and horizontally into disjoint paragraphs.

Step 302 (corresponding to Step 2 of Algorithm 1) includes discretizing one or more contiguous areas of a PDF document and detecting alignment. Detecting alignment can include grouping the one or more identified text objects into sub-sets containing aligned text objects, aligned vertically or horizontally, on the left (top), center, or right (bottom). Discretizing can include identifying, for each of the one or more contiguous areas of the document, a discretization grid defined by a finite sequence of X-axis positions and a finite sequence of Y-axis positions. Discretizing can also include snapping the bounding boxes of text objects, ruling lines, and background-color rectangles into this discretization grid. Additionally, discretizing can include filtering and merging some ruling lines and/or background-color rectangles, converting some background-color rectangles into ruling lines, and identifying which ruling lines are connected to each other.

Step 304 (corresponding to Step 3 of Algorithm 1) includes detecting zero or more candidate ruling-line tables and/or table regions in each contiguous area of the PDF document by finding all disjoint ruling-line grids and ruling-line frames (incomplete grids) available within that area, based on the one or more identified ruling lines.

Step 306 (corresponding to Step 4 of Algorithm 1) includes generating and/or identifying one or more virtual "white-space" separator lines within the one or more discretized contiguous areas of the PDF document. Besides the "white-space" separator lines, such generating can add as virtual lines all graphical (ruling) lines after they have been filtered, discretized, and merged. This generating step can also involve removing or adjusting the virtual lines that cannot be table boundaries or in-table separators due to their relationship to text objects and other lines. As part of removing or adjusting the virtual lines, at least one embodiment of the invention can include measuring the proximity of each of one or more virtual lines to one or more text objects, determining whether the area between the virtual line and a text object is free from other text objects, and evaluating one or more rules over each of the one or more virtual lines.

The rules can include, for example, a rule related to margin size, a rule related to overlapping a ruling line, a rule related to the number of crossing objects, a rule related to one or more shared properties within groups of adjacent text objects, and/or an alignment-related rule. Further, one or more embodiments of the invention can include scoring each of the one or more virtual lines by performing a weighted or a priority-based aggregation on the outputs of the one or more rules. Subsequent to the scoring, such an embodiment can include removing some of the one or more virtual lines that have a low score or/and have too few intersections with high-scoring virtual lines. Also, subsequent to the removing, such an embodiment can include trimming each of the remaining virtual lines to start and end at an intersection, and de-duplicating the trimmed virtual lines to generate the one or more virtual lines within the one or more discretized contiguous areas of the PDF document.

Step 308 (corresponding to Step 5 of Algorithm 1) includes detecting zero or more candidate table regions within each of the discretized contiguous areas of the PDF document by clustering the area's virtual lines, and their pairwise intersections, into one, two and/or more grids (clusters). These virtual lines can originate from "white-space" separator lines and ruling lines that have been preprocessed as described in Step 306. In at least one embodiment of the invention, such clustering is performed by running NMF over the matrix having rows that represent the area's horizontal virtual lines, having columns that represent the area's vertical virtual lines, and having cell values that indicate whether or not the corresponding two virtual lines intersect. Detecting the zero or more candidate table regions can include, for each of the one or more grids, determining zero or more rectangular areas that maximize the aggregated predominant affinity to this grid across all qualified virtual line intersections inside the area.

Step 310 (corresponding to Step 6 of Algorithm 1) includes determining table borders and cell structure for all candidate table regions. This determining converts the vertical and horizontal lines within each candidate table region into a collection of disjoint rectangular cells. The determining can include: (1) scoring, filtering, adjusting, and de-duplicating the ruling and/or virtual lines present in and around each candidate table region; (2) extending the lines to partition each candidate region into rectangular cells; and (3) adjusting the cell structure to correct malformed cells and merging redundant (empty) cells. At least one embodiment of the invention can also include iteratively finding all non-convex corners in all non-rectangular connected areas separated by virtual or ruling lines, then extending the lines involved in these non-convex corners until these lines touch orthogonal lines (or table borders). Once all cells are rectangular, some cell boundaries can be removed if the merged cells remain rectangular; for example, the cell boundaries that cross phrases or create redundant empty cells.

Step 312 (corresponding to Step 7 of Algorithm 1) includes assigning fitness scores to candidate tables. The fitness score assigned to each candidate table can be based on the candidate table's size, borders, ruling and virtual separator lines, row/column and cell structure, text blocks, alignment, density, adjust and split options, and other features. At least one embodiment of the invention includes evaluating each table by comparing the location of its parts, such as text blocks and line segments, to a set of one or more assumptions about how a well-formed table looks. Such an embodiment also includes evaluating table fitness metrics over a range of potential border adjustments and table splits. Each adjusted border's score or split-line's score can involve a weighted sum of a cell structure penalty, a dense-parts penalty, a sparse-parts gain, and the line's own score. A cell structure penalty is the sum of all penalties for cell structure violations caused by the proposed adjustment or split. A dense-parts penalty is the sum of all penalties for crossing "dense" text blocks and lines. A sparse-parts gain is the sum of all gains from components found on only one side of the split-line. The line's "own" score credits a line if it looks like a natural place for a table border.

Step 314 (corresponding to Step 8 of Algorithm 1) includes creating new candidate table regions by adjusting and/or splitting the candidate tables scored in Step 312. The scoring process identifies the best adjusted border positions and split lines, used here in Step 314 to generate new candidate table regions by adjusting and/or splitting some of the previously-identified candidate table regions.

Steps 310, 312, and 314 can work in a loop (that is, carried out iteratively), processing one candidate table region, or a batch of such regions, at a time, while adding new candidate table regions in Step 314. In one or more embodiments of the invention, the loop ends when the queue is empty or when some form of a time limit is reached. All candidate tables with cell structure and scores are saved separately, and are later made available to Step 316.

Step 316 (corresponding to Step 9 of Algorithm 1) includes outputting zero or more of the candidate table regions as a finalized table in accordance with scores assigned to each of the candidate table regions in Step 312. At least one embodiment of the invention outputs zero or more finalized tables for each contiguous area of the document by selecting a non-overlapping subset of candidate tables (table regions with cell structure) that has the maximum aggregated score.

Also, an additional embodiment of the invention includes, for each of the one or more contiguous areas of the portable document format document: identifying inside the area (i) one or more text objects and (ii) zero or more ruling lines; discretizing the area by (i) computing a discretization grid and (ii) snapping the area's identified objects and lines into this grid; generating one or more virtual lines from the white spaces and ruling lines separating the area's identified text objects; and filtering and adjusting the area's virtual lines based on their proximity to the area's identified text objects and other lines. Such an embodiment can additionally include detecting zero or more candidate table regions within the one or more discretized contiguous areas of the portable document format document by (i) clustering the one or more virtual lines into one or more grids, (ii) identifying zero or more ruling line grids, and (iii) adjusting or splitting previously detected candidate table regions; determining the cell structure of the detected candidate table regions; selecting zero or more of the candidate table regions as finalized tables in accordance with scores assigned to each of the detected candidate table regions based on (i) border information and (ii) cell structure information; and generating and outputting a hypertext markup language (HTML) file in accordance with each of the zero or more finalized tables.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
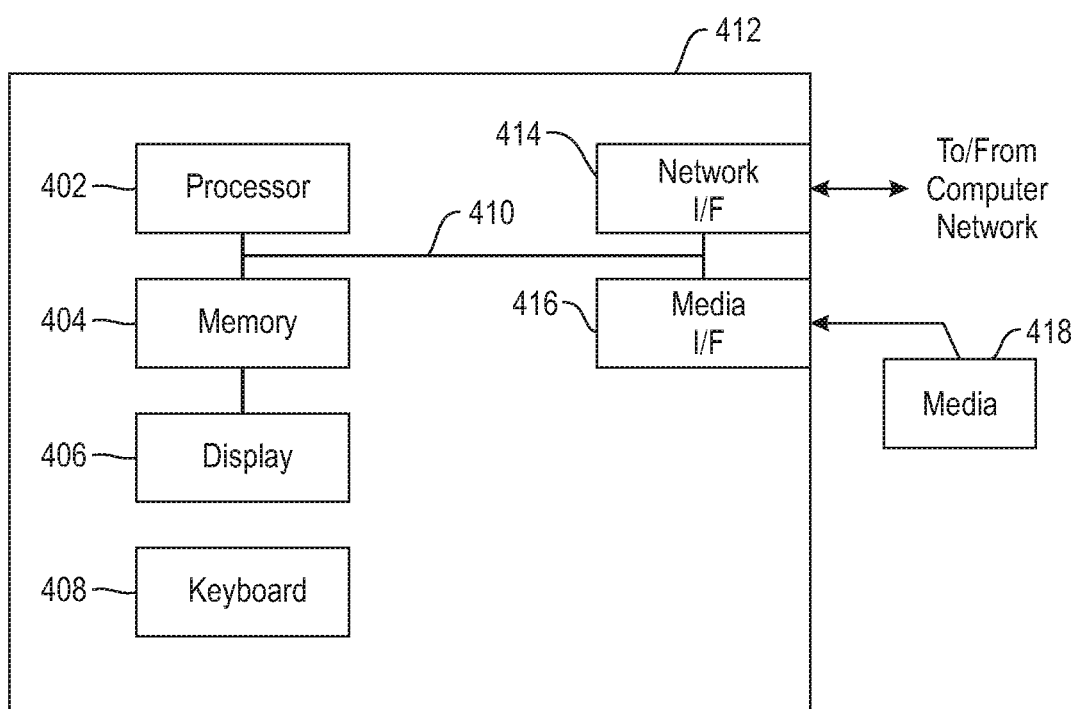
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a MEMORY STICK (removable flash memory card format), a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
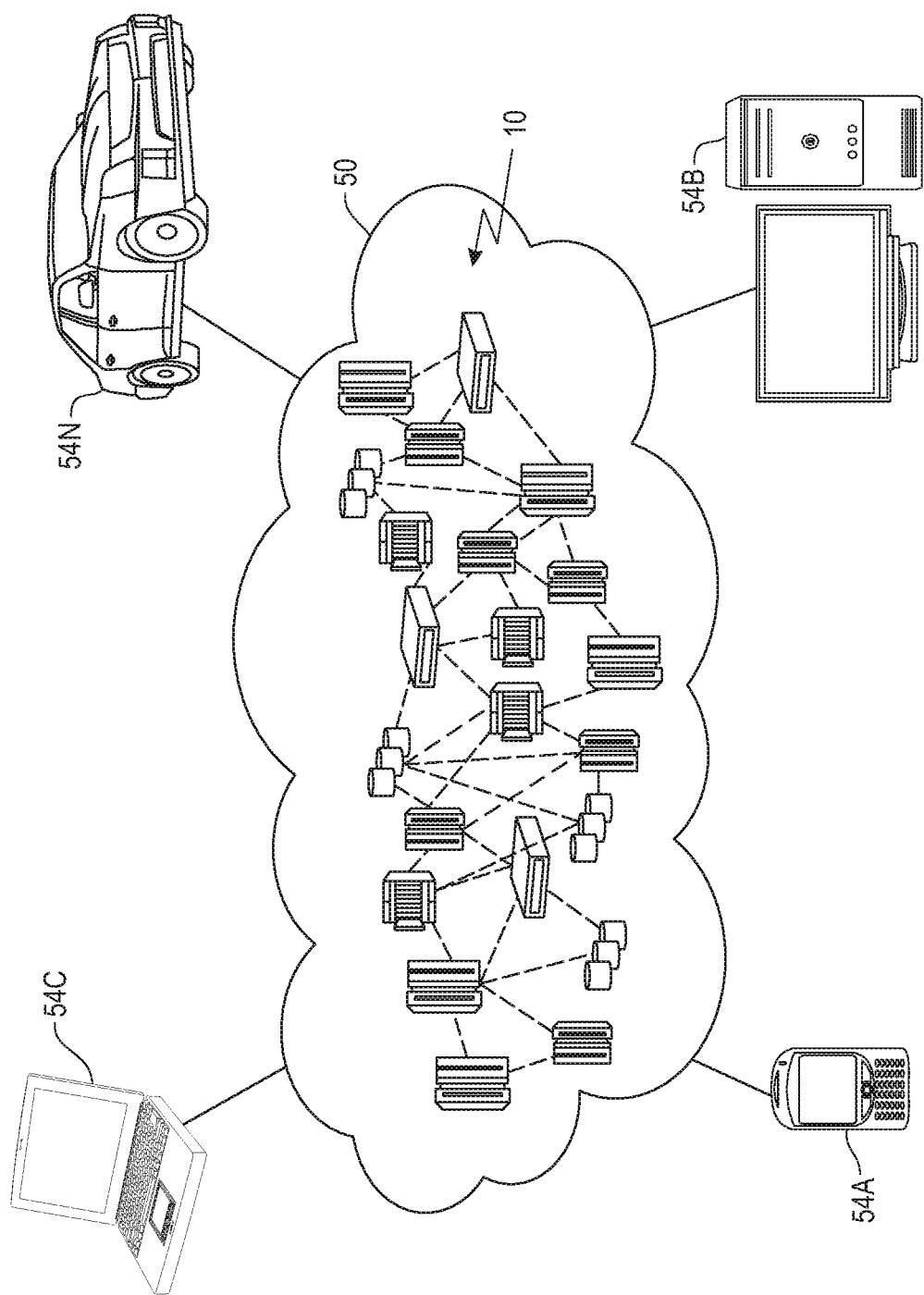
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
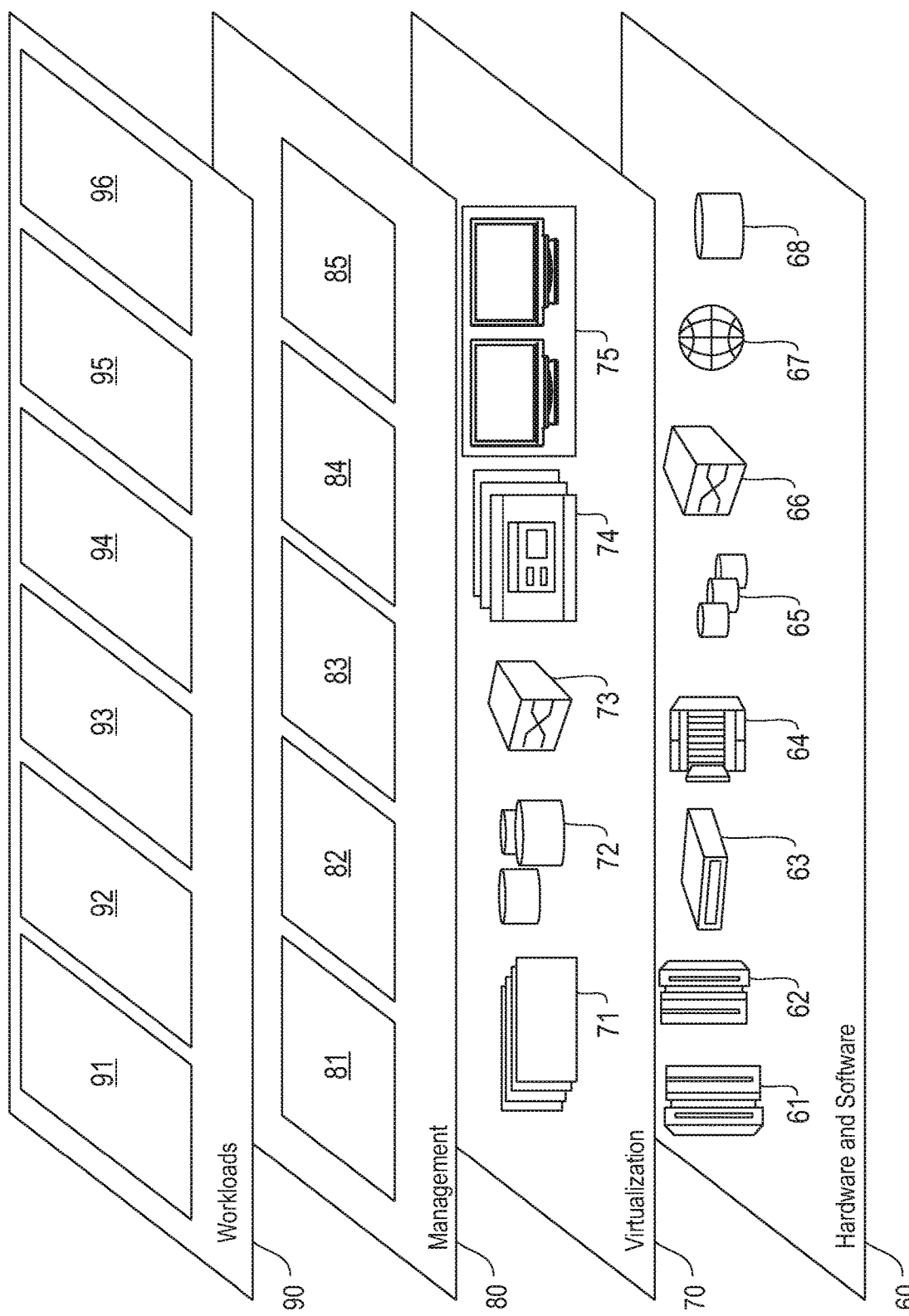
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and table recognition 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, processing virtual white-space lines that separate blocks of text, in addition to the printed ruling lines, and identifying tables by finding grids formed by such lines.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method:
    identifying one or more composite text objects within a portable document format document, wherein each of said one or more composite text objects comprises a grouping of spatially adjacent and semantically linked text objects of the portable document format document, wherein said identifying is based at least in part on vectors indicative of at least one or more content features corresponding to the text objects;
    discretizing one or more contiguous areas of said portable document format document based at least in part on said identified one or more composite text objects;
    identifying one or more white-space separator lines within the one or more discretized contiguous areas of the portable document format document;
    generating one or more virtual lines from at least one of (i) white-spaces separating the one or more identified composite text objects within the one or more discretized contiguous areas of the portable document format document, (ii) one or more ruling lines identified within the one or more discretized contiguous areas of the portable document format document, and (iii) one or more background-color rectangles identified within the one or more discretized contiguous areas of the portable document format document;
    detecting one or more candidate table regions within the one or more discretized contiguous areas of the portable document format document by clustering, for each of the one or more discretized contiguous areas, the area's virtual lines and pairwise intersections thereof into one or more grids, wherein said clustering comprises a performing non-negative matrix factorization process to approximate an intersection matrix using (i) a first matrix having entries that represent the area's horizontal virtual lines and (ii) a second matrix having entries that represent the area's vertical virtual lines, wherein the intersection matrix indicates intersections between the area's horizontal virtual lines and the area's vertical virtual lines, and wherein said non-negative matrix factorization process is performed for each of one or more specified numbers of clusters; and
    outputting at least one of the candidate table regions as a finalized table in accordance with scores assigned to each of the one or more candidate table regions based on (i) border information and (ii) cell structure information;
    wherein the method is carried out by at least one computing device.

2. The computer-implemented method of claim 1, wherein said discretizing comprises:
    identifying, for each of the one or more contiguous areas of the portable document format document, a discretization grid defined by a finite sequence of X-axis positions and a finite sequence of Y-axis positions; and
    incorporating, into the discretization grid, one or more bounding boxes pertaining to at least one of (i) said one or more identified composite text objects, (ii) said one or more ruling lines, and (iii) said one or more background-color rectangles.

3. The computer-implemented method of claim 2, wherein said discretizing comprises:
    selecting a type of the one or more identified composite text objects;
    projecting the one or more bounding boxes of all text objects of the selected type to both the X-axis and the Y-axis, thereby generating a set of intervals for each of the axes;
    on each of the axes, sorting the start-points and the end-points of all intervals;

on each of the axes, identifying all instances wherein one interval's end-point is followed by another interval's start-point;

on each of the axes, for each of the identified instances, assigning one discretization grid position between the end-point and the start-point; and on each of the axes, additionally assigning two additional discretization grid positions: one additional discretization grid position before all of said intervals and one additional discretization grid position after all of said intervals.

4. The computer-implemented method of claim 1, wherein said identifying one or more white-space separator lines within the one or more discretized contiguous areas of the portable document format document comprises measuring the proximity of each of the one or more virtual lines to one or more of the text objects.

5. The computer-implemented method of claim 4, wherein said measuring comprises, for each of the one or more virtual lines, (i) determining whether the area between the virtual line and a text object is free from one or more other text objects, and (ii) counting one or more other virtual lines that pass between the virtual line and the text object.

6. The computer-implemented method of claim 5, comprising:

evaluating one or more rules over each of the one or more virtual lines, wherein the one or more rules comprise at least one of (i) a rule related to margin size, (ii) a rule related to overlapping a ruling line, (iii) a rule related to the number of crossing objects, (iv) a rule related to the number and proximity of text objects, (v) a rule related to one or more shared properties within groups of adjacent text objects, and (vi) an alignment-related rule.

7. The computer-implemented method of claim 6, comprising:

scoring each of the one or more virtual lines by aggregating the one or more rules; and removing each of the one or more virtual lines that has at least one of (i) a score below a pre-determined threshold and (ii) a number of intersections with high-scoring virtual lines that is below a pre-determined threshold.

8. The computer-implemented method of claim 7, comprising:

subsequent to said removing, performing at least one of (i) trimming each of the remaining virtual lines to start and end at an intersection, and (ii) removing duplicate and redundant virtual lines to generate the one or more white-space separator lines within the one or more contiguous areas of the portable document format document.

9. The computer-implemented method of claim 1, wherein said outputting comprises:

processing a collection of candidate table regions in a loop, one or more of the candidate table regions at a time;

converting each of the candidate table regions into a candidate table by determining its table borders and cell structure;

for each of the candidate tables, assigning a fitness score based on (i) border information and (ii) cell structure information;

for each of the candidate tables, generating zero or more new candidate table regions by (i) adjusting the candidate table, and (ii) adding the zero or more generated candidate table regions to the collection of candidate table regions;

storing all of the candidate tables and the corresponding fitness scores;

upon termination of the loop, generating zero or more finalized tables by selecting a sub-set of non-overlapping candidate tables with a maximum aggregated fitness score.

10. The computer-implemented method of claim 9, wherein said assigning comprises:

for each of the candidate tables, comparing the location of the table's (i) rows, (ii) columns, (iii) cells, (iv) text blocks, and (v) line segments, to a set of one or more assumptions pertaining to table appearance;

evaluating one or more rules over one or more of the candidate tables, wherein the one or more rules comprise at least one of:

(i) a rule related to at least one (a) table size, (b) number of text objects, and (c) number of non-empty cells;

(ii) a rule related to at least one of (a) cell structure and (b) cell contents;

(iii) a rule related to at least one of (a) row structure, (b) column structure, (c) row contents, and (d) column contents;

(iv) a rule related to at least one of (a) crossing aligned text blocks and (b) crossing ruling lines;

(v) a rule related to overlapping a ruling line;

(vi) a rule related to one or more parts of a table being on only one side of a splitting line; and (vii) a rule related to at least one of (a) comparing two sides of a table border and (b) comparing two sides of a splitting line.

11. The computer-implemented method of claim 9, wherein said generating comprises:

for one or more borders of at least one of the candidate tables, (i) identifying at least one adjusted border, and (ii) generating a new candidate table region with the adjusted border;

identifying one or more splitting lines for at least one of the candidate tables; and generating new candidate table regions for the sides of each of the one or more splitting lines.

12. The computer-implemented method of claim 1, wherein the non-negative matrix factorization process comprise approximating the intersection matrix with the product of first matrix and the transpose of the second matrix.

13. A computer program product comprising a computer readable storage medium having program instructions embodied therewith, the program instructions executable by a computing device to cause the computing device to:

identify one or more composite text objects within a portable document format document, wherein each of said one or more composite text objects comprises a grouping of spatially adjacent and semantically linked text objects of the portable document format document, wherein said identifying is based at least in part on vectors indicative of at least one or more content features corresponding to the text objects;

discretize one or more contiguous areas of said portable document format document based at least in part on said identified one or more composite text objects;

identify one or more white-space separator lines within the one or more discretized contiguous areas of the portable document format document;

generate one or more virtual lines from at least one of (i) white-spaces separating the one or more identified composite text objects within the one or more discretized contiguous areas of the portable document format document, (ii) one or more ruling lines identified within the one or more discretized contiguous areas of the portable document format document, and (iii) one or more background-color rectangles identified within the one or more discretized contiguous areas of the portable document format document;

detect one or more candidate table regions within the one or more discretized contiguous areas of the portable document format document by clustering, for each of the one or more discretized contiguous areas, the area's virtual lines and pairwise intersections thereof into one or more grids, wherein said clustering comprises performing a non-negative matrix factorization process to approximate an intersection matrix using (i) a first matrix having entries that represent the area's horizontal virtual lines and (ii) a second matrix having entries that represent the area's vertical virtual lines, wherein the intersection matrix indicates intersections between the area's horizontal virtual lines and the area's vertical virtual lines, and wherein said non-negative matrix factorization process is performed for each of one or more specified numbers of clusters; and output at least one of the candidate table regions as a finalized table in accordance with scores assigned to each of the one or more candidate table regions based on (i) border information and (ii) cell structure information.

14. The computer program product of claim 13, wherein said discretizing comprises:

identifying, for each of the one or more contiguous areas of the portable document format document, a discretization grid defined by a finite sequence of X-axis positions and a finite sequence of Y-axis positions; and incorporating, into the discretization grid, one or more bounding boxes pertaining to at least one of (i) said one or more identified composite text objects, (ii) one or more ruling lines, and (iii) one or more background-color rectangles.

15. The computer program product of claim 14, wherein said discretizing comprises:

selecting a type of the one or more identified composite text objects;

projecting the one or more bounding boxes of all text objects of the selected type to both the X-axis and the Y-axis, thereby generating a set of intervals for each of the axes;

on each of the axes, sorting the start-points and the end-points of all intervals;

on each of the axes, identifying all instances wherein one interval's end-point is followed by another interval's start-point;

on each of the axes, for each of the identified instances, assigning one discretization grid position between the end-point and the start-point; and on each of the axes, additionally assigning two additional discretization grid positions: one additional discretization grid position before all of said intervals and one additional discretization grid position after all of said intervals.

16. The computer program product of claim 13, wherein said identifying one or more white-space separator lines within the one or more discretized contiguous areas of the portable document format document comprises measuring the proximity of each of the one or more virtual lines to one or more of the text objects.

17. The computer program product of claim 16, wherein said measuring comprises, for each of the one or more virtual lines, (i) determining whether the area between the virtual line and a text object is free from one or more other text objects, and (ii) counting one or more other virtual lines that pass between the virtual line and the text object.

18. The computer program product of claim 17, wherein the program instructions cause the computing device to:

evaluating one or more rules over each of the one or more virtual lines, wherein the one or more rules comprise at least one of (i) a rule related to margin size, (ii) a rule related to overlapping a ruling line, (iii) a rule related to the number of crossing objects, (iv) a rule related to the number and proximity of text objects, (v) a rule related to one or more shared properties within groups of adjacent text objects, and (vi) an alignment-related rule.

19. The computer program product of claim 18, wherein the program instructions cause the computing device to:

scoring each of the one or more virtual lines by aggregating the one or more rules; and removing each of the one or more virtual lines that has at least one of (i) a score below a pre-determined threshold and (ii) a number of intersections with high-scoring virtual lines that is below a pre-determined threshold.

20. A system comprising:

a memory; and at least one processor operably coupled to the memory and configured for:

identifying one or more composite text objects within a portable document format document, wherein each of said one or more composite text objects comprises a grouping of spatially adjacent and semantically linked text objects of the portable document format document, wherein said identifying is based at least in part on vectors indicative of at least one or more content features corresponding to the text objects;

discretizing one or more contiguous areas of said portable document format document based at least in part on said identified one or more composite text objects;

identifying one or more white-space separator lines within the one or more discretized contiguous areas of the portable document format document;

generate one or more virtual lines from at least one of (i) white-spaces separating the one or more identified composite text objects within the one or more discretized contiguous areas of the portable document format document, (ii) one or more ruling lines identified within the one or more discretized contiguous areas of the portable document format document, and (iii) one or more background-color rectangles identified within the one or more discretized contiguous areas of the portable document format document;

detecting one or more candidate table regions within the one or more discretized contiguous areas of the portable document format document by clustering, for each of the one or more discretized contiguous areas, the area's virtual lines and pairwise intersections thereof into one or more grids, wherein said clustering comprises performing a non-negative matrix factorization process to approximate an intersection matrix using (i) a first matrix having entries that represent the area's horizontal virtual lines and (ii) a second matrix having entries that represent the area's vertical virtual lines, wherein the intersection matrix indicates intersections between the area's horizontal virtual lines and the area's vertical virtual lines, and wherein said non-negative matrix factorization process is performed for each of one or more specified numbers of clusters; and outputting at least one of the candidate table regions as a finalized table in accordance with scores assigned to each of the one or more candidate table regions based on (i) border information and (ii) cell structure information.

\* \* \* \* \*